Sept. 11, 1956
L. E. ELFES
2,762,140
UNIVERSALLY ADJUSTABLE SCRAPER IMPLEMENT
Filed Aug. 23, 1951
4 Sheets-Sheet 1
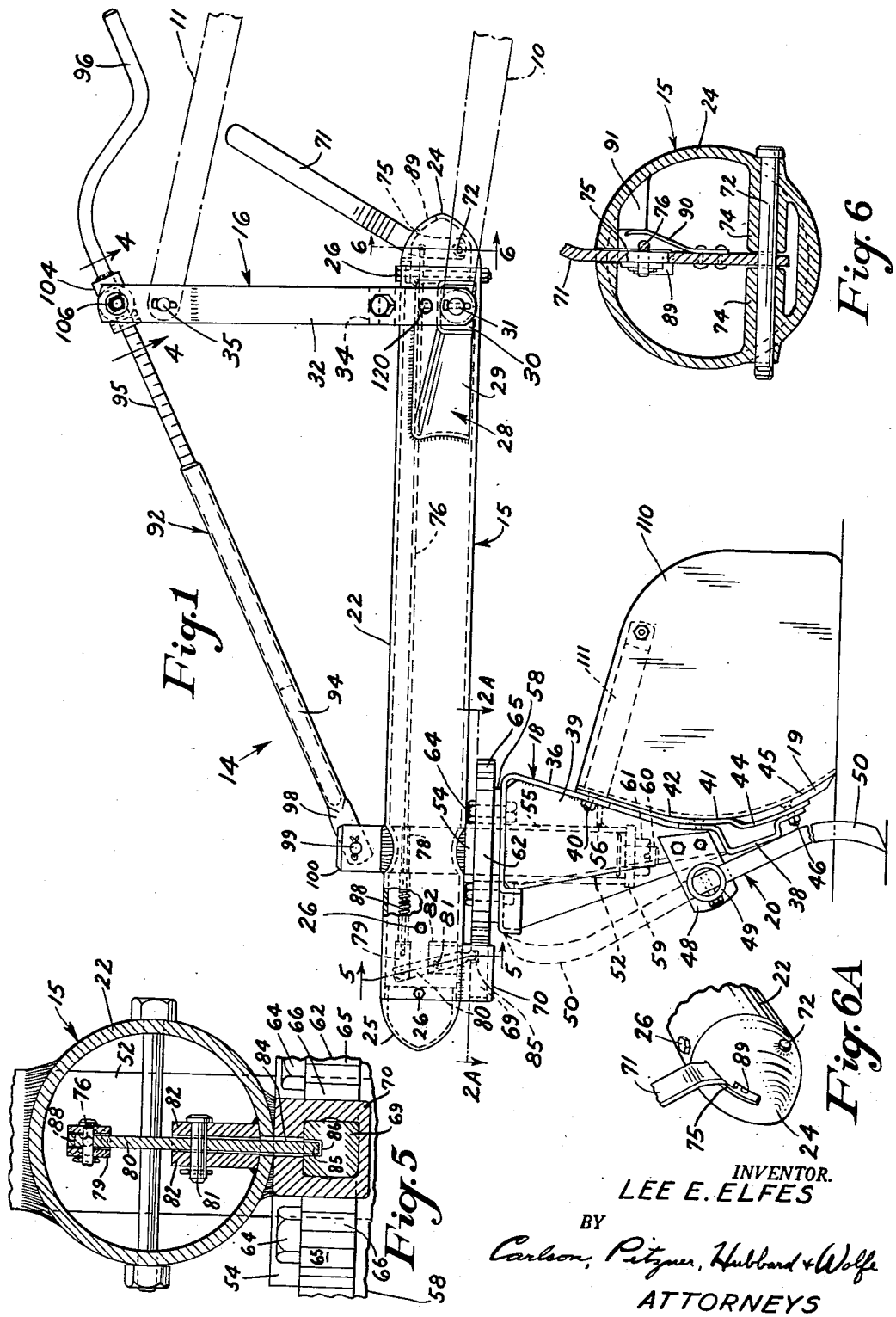
INVENTOR.
LEE E. ELFES
BY
Carlson, Pitzner, Hubbard & Wolfe
ATTORNEYS

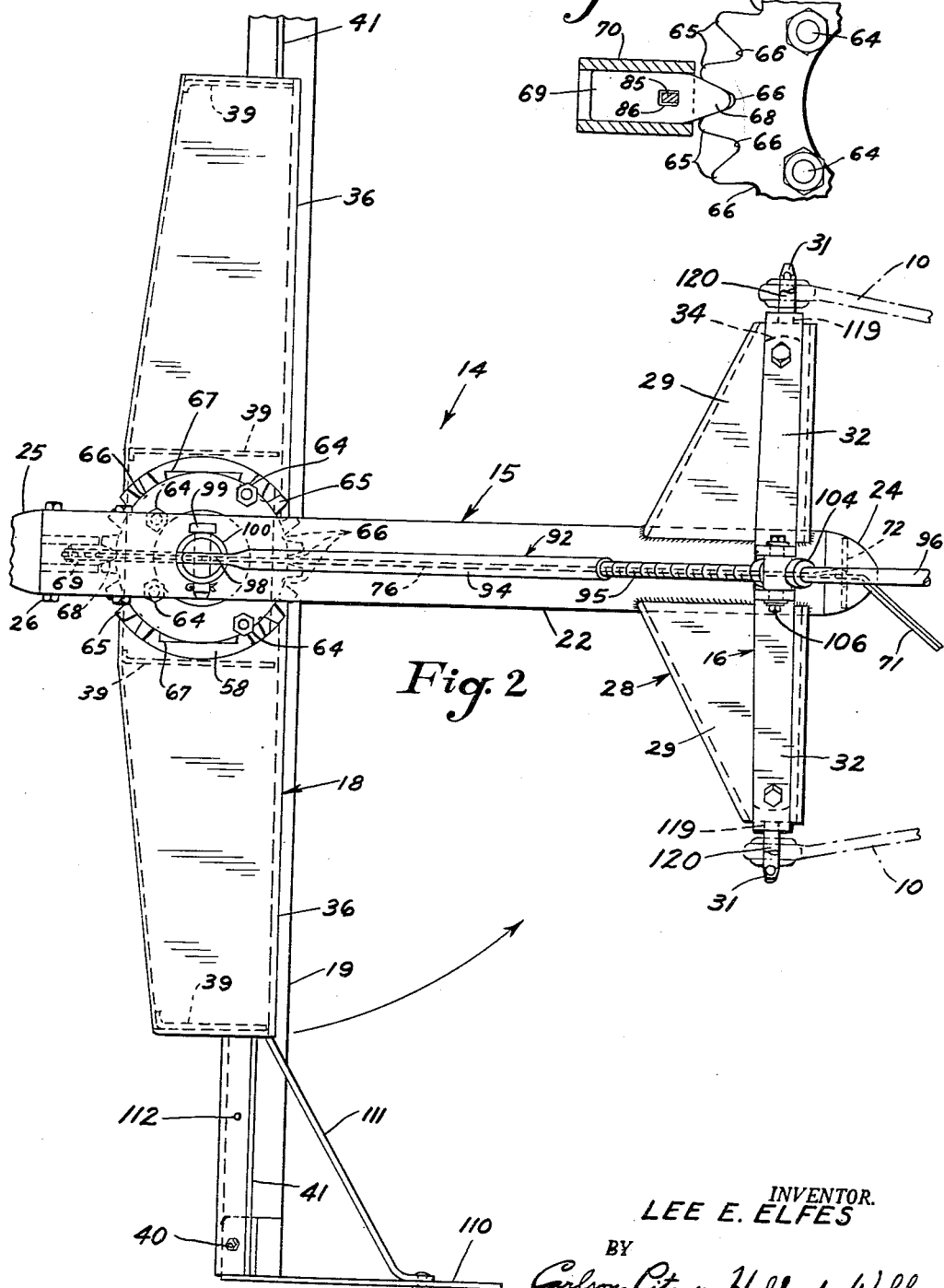

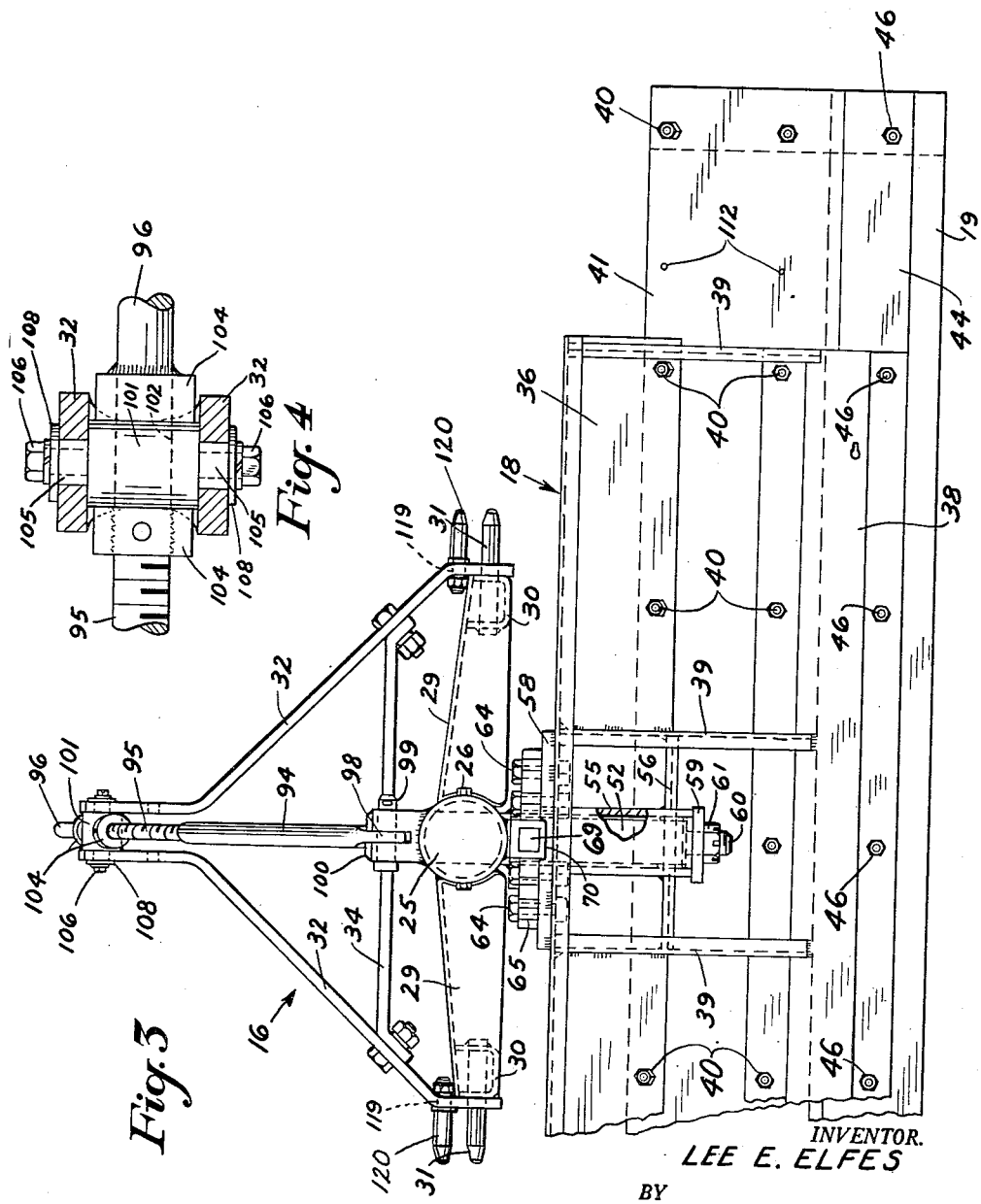

Sept. 11, 1956  L. E. ELFES  2,762,140
UNIVERSALLY ADJUSTABLE SCRAPER IMPLEMENT
Filed Aug. 23, 1951  4 Sheets-Sheet 4
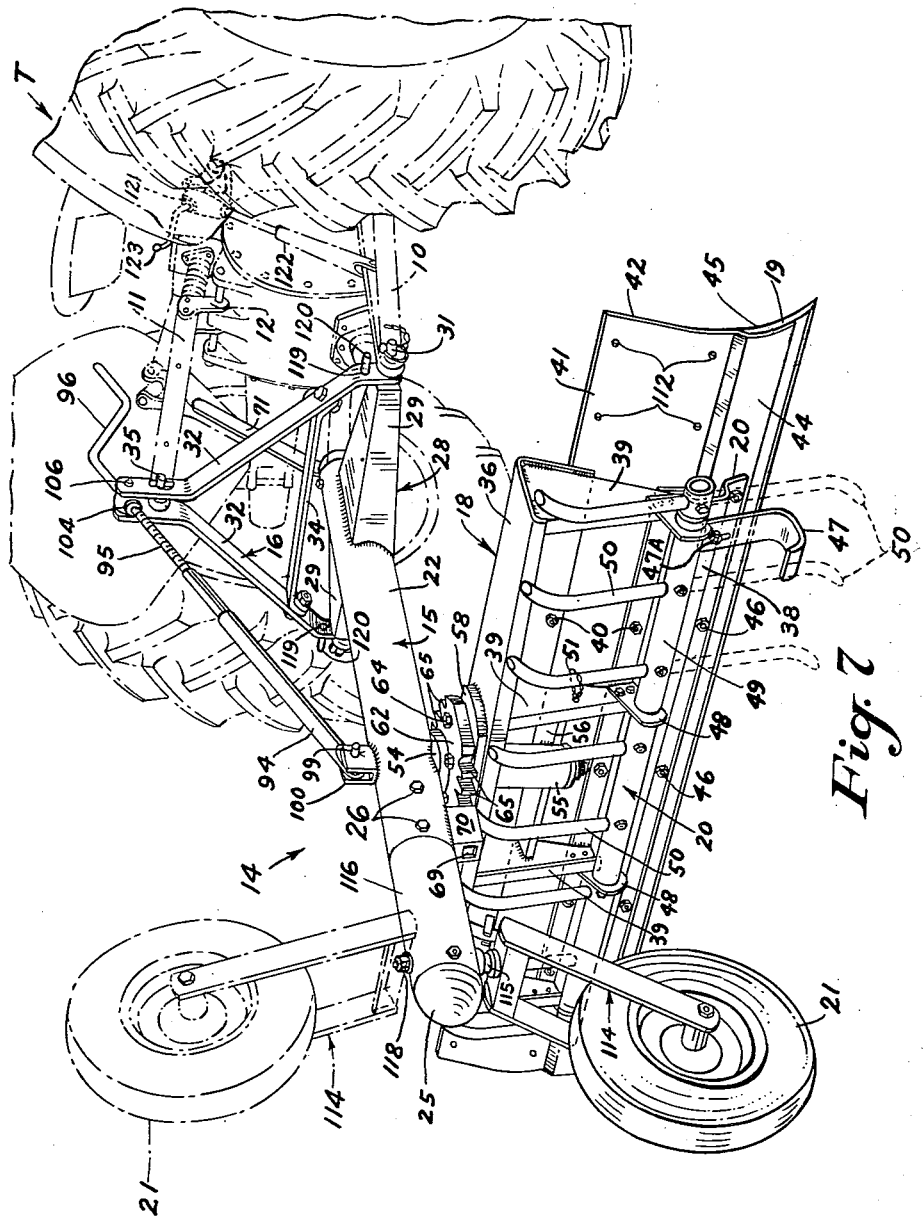
INVENTOR.
LEE E. ELFES
BY
Carlson, Pitzner, Hubbard & Wolfe
ATTORNEYS

United States Patent Office 2,762,140
Patented Sept. 11, 1956

2,762,140

UNIVERSALLY ADJUSTABLE SCRAPER IMPLEMENT

Lee E. Elfes, Detroit, Mich., assignor to Harry Ferguson, Inc., Detroit, Mich., a corporation of Delaware Application August 23, 1951, Serial No. 243,273

8 Claims. (Cl. 37—159)

The present invention relates generally to earthworking implements and more specifically to a novel scraper implement for attachment to a tractor.

The invention finds particular, but not exclusive, utility when applied to an implement for use with a tractor of the type disclosed in Henry George Ferguson Patent No. 2,118,180, issued May 24, 1938.

One object of the invention is to provide a scraper implement having an earthworking unit susceptible of being precisely disposed in any selected one of a plurality of angular positions transverse to the path of the tractor, being maintained in the selected position with exceptional rigidity. A related object is to provide an angular positioning means for the earthworking unit and which will be adapted to insure rigidity of adjustment by compensating automatically for wear on its parts.

Another object of the invention is to provide a scraper implement of the character set forth and having means for regulating the fore-and-aft attitude of the earthworking unit by taking advantage of the hitch means connecting the implement to the tractor.

A further object is to provide a scraper implement wherein the angular and attitude adjusting means for the earthworking unit will be readily accessible to the operator of the tractor and protected against damage due to the action of dirt or handling of the implement.

Still another object is to provide a scraper implement of the foregoing type and which will include in the earthworking unit a scarifier device having both an operative and an inoperative position.

Another object is to provide an implement of the character set forth and which will be susceptible of economical construction, largely from readily available structural elements, but possessing great mechanical strength as well as a clean appearance.

Other objects and advantages will become apparent as the following detailed description proceeds, taken together with the accompanying drawings, in which:

Figure 1 is a side elevation of an illustrative implement embodying the present invention, certain hitch elements associated with the tractor being indicated in dot-dash outline.

Fig. 2 is a fragmentary plan view of the illustrative implement shown in Fig. 1.

Fig. 2A is an enlarged fragmentary horizontal sectional view taken in the plane of the line 2A—2A in Fig. 1.

Fig. 3 is a fragmentary rear elevation of the implement shown in Fig. 1, the scarifier attachment having been omitted for purposes of clearer illustration.

Fig. 4 is an enlarged fragmentary sectional view through the pivotal connection at the upper end of the A-frame, such view being taken in the plane of the line 4—4 in Fig. 1.

Figs. 5 and 6 are enlarged fragmentary transverse sectional views through the forward and rearward end portions of the implement as shown in Fig. 1, such views being taken in the planes of the lines 5—5 and 6—6, respectively.

Fig. 6A is an enlarged fragmentary perspective view of the nose portion of the main frame of the illustrative implement.

Fig. 7 is a perspective view of the implement of Fig. 1 but showing the latter hitched in trailed relation to a tractor and having a land wheel mounted thereon.

Referring more particularly to the drawings, the invention has been exemplified therein as embodied in a scraper implement especially designed for use with the present commercial form of "Ferguson" tractor. It will be appreciated by those skilled in the art, however, that various substitutions or changes in parts, or alternative or modified arrangements may be used, particularly in accommodating the implement to other specific forms of tractors. There is, therefore, no intention to limit the invention to the precise embodiment illustrated herein. On the contrary, the intention is to cover all alternative or equivalent constructions falling within the spirit and scope of the invention as expressed in the appended claims.

The general construction and operation of the illustrated tractor T, including its hydraulically actuated hitch linkage, will be familiar to those skilled in the art and for further details reference might also be made to Ferguson Patent No. 2,118,180, mentioned above. For present purposes, however, it will be sufficient to note that the tractor T has a pair of trailing hitch links 10 disposed in forwardly converging, side-by-side relation, being pivoted on the rear end housing below and slightly forward of the rear axle (not shown in detail). The links 10 are adapted to be raised and lowered in unison by means of the well-known hydraulic power lift on the tractor. Vertically spaced above and centrally located relative to the lower draft links 10 is a compression link 11 which is pivoted to control element 12 on the rear end portion of the tractor and which controls the hydraulic power lift.

Referring more specifically to the drawings, the invention is shown exemplified in an illustrative scraper implement 14 assembled upon a rigid main frame 15 disposed in fore-and-aft, trailed relation with the tractor T. At its leading end, the main frame 15 has an appropriate connecting means, including an upstanding A-frame 16, pivotally and detachably connecting the implement to the tractor hitch links 10, 11 at vertically spaced points. Adjacent its trailing end, the main frame 15 has mounted in depending relation therefrom an earthworking unit 18. The latter is pivotally attached to the main frame 15 for angular movement about a generally upright axis, being adjustable into any selected one of a number of precisely predetermined angular positions transverse to the fore-and-aft axis of the implement and the tractor. The unit 18 includes a scraper blade 19 and a scarifier device 20, the latter being shiftable between an operative and an inoperative position. The implement may also include a land wheel 21 to adapt it for land leveling operations (Fig. 7).

Turning now to the main frame 15, it will be perceived that the same comprises a hollow tubular body 22 terminating in a nose cap 24 and a tail cap 25, each secured to the tubular body 22 as by means of a transverse bolt 26 (Figs. 1, 6A). Adjacent its leading end, the main frame 15 is provided with a drawbar 28 defined in this instance by a pair of alined, laterally extending draft beams 29. Each of the latter may conveniently be fashioned as an inverted, tapered channel having its larger end welded or otherwise rigidly fixed to the tubular body 22. Rigidly fixed to the smaller ends of the draft beams 29 as by means of brackets 30 is a pair of hitch pins 31, each of the latter being susceptible of pivotal attachment to a corresponding one of the lower draft links 10 on the tractor T. The hitch pins 31 also serve as a means for pivotally attaching the depending ends of the A-frame 16 to the main frame 15 and to the links 10.

In the present instance, the A-frame 16 is defined by a pair of upwardly converging bar elements 32 each having substantially parallel but offset ends. The lower end portions of the bar elements 32 are maintained in properly spaced relation with each other by means of a rigid connecting strap 34. The upper end portions of the bar elements 32 are pivotally connected to the upper hitch link 11 of the tractor as by means of a hitch pin 35 (Figs. 1 and 7).

Referring next to the earthworking unit 18, it will be noted that the latter comprises a beam structure 36 having a substantially L-shaped cross section and being disposed with one of its cross-sectional legs extending substantially horizontally and the other depending therefrom. Spaced below and in approximately parallel relation with the beam structure 36 is a transverse stiffener in the form of a channel member 38. The latter is rigidly connected to the beam structure 36 as by means of a plurality of spaced apart, depending gusset plates 39 rigidly attached to the beam structure 36 and to the channel stiffener 38. Fixed to the beam structure 36 and the stiffener 38, as by means of bolts 40, is a mold board 41 having a concave earth engaging face 42 and a longitudinal offset 44 along its lower edge portion for nestingly receiving the scraper blade 19. The latter is mounted against the offset 44 in such a manner that its front face 45 forms an unbroken line of curvature with the main face 42 of the mold board. The blade 19 is attached to the mold board 41 as by means of bolts 46 which also engage the lower flange of the stiffener channel 38 (Figs. 1, 3 and 7). A pair of skids or feet 47, one of which is shown in Fig. 7, may be secured to the stiffener 38 as by means of a bolt 47A.

Rigidly fixed to the gusset plates 39 and projecting rearwardly therefrom, as viewed in Figs. 1 and 7, are a plurality of bearing brackets 48 which support the scarifier device 20. This device includes a hollow transverse shaft 49 journaled in the brackets 48 and having fixed thereto a plurality of radially projecting scarifier teeth 50. The depending end portions of the teeth 50 are preferably curved and sharpened to facilitate their action. The shaft 49 and teeth 50 of the scarifier device may be maintained in an inoperative position as indicated in Fig. 7 as by means of a retainer chain 51. By the same token, the teeth and shaft 49 may be rocked downwardly and into an active position wherein the teeth abut the stiffener channel 38, as indicated in Fig. 1. It should be borne in mind, however, that while Fig. 1 indicates the active position of the scarifier device 20 with relation to the earthworking unit 18, it would be necessary to shift the latter horizontally through approximately 180° to bring the scarifier device 20 into operative position with relation to the implement 14 and the tractor T.

Provision is made for pivotally attaching the earthworking unit 18 to the main frame 15 by means of a relatively simple structure which possesses great strength (see Figs. 1, 3 and 7). In furtherance of such objective, the trailing end portion of the main frame body 22 has fixed in depending relation therewith a pivot stem 52. Preferably, the stem 52 is disposed to project diametrically through the tubular body 22, being welded or otherwise rigidly fixed thereto. The stem 52 is also provided with a flange 54 welded or otherwise rigidly fixed to the underside of the tubular body 22 and which serves as a thrust plate for the unit 18. Journaled on the stem 52 below the thrust plate 54 is a bearing sleeve 55, the latter being rigidly fixed to the earthworking unit 18 as by means of a strut 56 spanning the two central gusset plates 39. In addition, the sleeve 55 is also fixed at its upper end to the beam member 36 as by means of a laterally extending rectangular flange 58. The bearing sleeve 55 is retained on the stem 52 as by means of a thrust washer 59 attached to the lower end of the stem as by means of a threaded stud 60 and nut 61.

Provision is made for effecting exceptionally rigid and precise angular positioning of the earthworking unit 18, including the scraper blade 19, in any one of a number of selected angular positions about the pivot stem 52 and transverse to the fore-and-aft path of the implement. This is accomplished by the use of simple but rugged detent members adapted to compensate automatically for wear on their coacting surfaces, one detent member being mounted on the main frame 15 and the other detent member being mounted on the earthworking unit 18. In this instance, the earthworking unit 18 has fixed thereto a gear-like adjusting plate 62 disposed in surrounding relation with the bearing sleeve 55. The plate 62 is rigidly secured to the bearing sleeve flange 58 and the structural member 36 as by means of through bolts 64. The adjusting plate 62 is provided with a plurality of relatively heavy, circumferentially spaced teeth 65 defining positioning notches 66 each of which is engageable by the tapered end 68 of a locking plunger 69. The latter is slidably housed within a guide block 70 rigidly fixed as by welding to the underside of the tubular body 22 at a point above and to the rear of the earthworking unit 18. To provide compensation for wear between the walls of the notches 66 and the tapered end 68 of the plunger 69, the parts are proportioned initially so that the portion 68 will be capable of substantial engagement with each notch 66 while leaving a reasonable amount of radial clearance between the end of the plunger and the bottom of the notch. Thus by yieldably biasing the plunger 69 into its associated notch 66, it will be appreciated that an effective wear compensating arrangement is provided.

Upon more particular reference to Figs. 1, 2 and 7, it will be noted that the teeth 65 and their intervening notches 66 are arranged in two circumferentially spaced sets on the adjusting plate 62, such sets being separated by a pair of diametrically opposed lands 67. The rearward set of teeth and notches 65, 66 (as viewed in the drawings) serves to define the operative angular positions of the earthworking unit 18 when the scraper blade 19 is in use. Conversely, the teeth and notches 65, 66 on the forward end of the plate 62 serve to define the range of angular positions required for use of the scarifier device 20, the unit 18 being angularly displaced through approximately 180° for this purpose.

Provision is made for actuating the locking plunger 69 to permit angular positioning of the unit 18 by means of a control at the forward end of the implement 14 readily accessible to the tractor operator, such control being connected to the plunger 69 by a mechanism protectively enclosed within the tubular member 22 of the main frame 15 (see Figs. 1, 6 and 6A). Thus there is pivoted within the nose cap 24 an actuating lever 71 having its lower end journaled on transverse pin 72 which runs axially of a pair of alined internal bosses 74. The lever 71 projects upwardly through an arcuate slot 75 in the nose cap 24 and is preferably bent to give it a slight lateral and forward inclination to provide accessibility and clearance with the top hitch link 11. Pivotally attached to the control lever 71 at a point spaced from its lower end but located within the nose cap 24 is a rearwardly extending tensile member in the form of an actuating rod 76. The rod 76 passes through an alined bore 78 in the pivot stem 52 and terminates at its rearward end in a clevis 79 (Figs. 1 and 5). The clevis 79 is connected with the plunger 69 as by means of a depending rocker arm 80 which has its intermediate portion journaled on a pivot pin 81 carried by a pair of upstanding brackets 82 fixed to the inner peripheral surface of the tubular main frame body 22. The lower end of the rocker arm 80 projects through a clearance recess 84 in the wall of the body 22 and the guide block 70, terminating in a finger portion 85 having a rounded profile. The finger portion 85 reaches into an appropriate recess 86 in the top face of the plunger 69. For the purpose of biasing the plunger 69 into a normally engaged position with a selected one of the notches 66, an appropriate biasing spring 88 is interposed between the clevis 79 and the pivot stem 52, being disposed in surrounding relation with the rod member 76. Such arrangement also serves to maintain the manual control lever 71 adjacent the upper end of the slot 75, as illustrated in Figs. 1 and 6A. By the same token, disengagement of the plunger 69 from the adjusting plate 62 may readily be effected by rocking the manual control lever 71 clockwise (as viewed in Fig. 1) to the lower end of the slot 75. This imparts a corresponding clockwise rotational movement to the rocker arm 80, resulting in a rearward shift and ultimate disengagement of the plunger 69 from its associated recess 66.

For the purpose of maintaining the plunger 69 in its disengaged position against the biasing force of the spring 88 while the earthworking unit 18 is rotated to the desired angular position on the stem 52, the lower end portion of the slot 75 is laterally enlarged to define in one wall thereof a notch 89 of appropriate length to receive the control lever 71 (Figs. 6 and 6A). The lower end of the latter is attached to the pin 72 with sufficient clearance to permit a slight degree of lateral rocking of the lever 71 incident to entering the slot 89. In addition, the lever 71 is provided with biasing means for urging it into the retaining slot 89 and holding it there while the unit 18 is being angularly adjusted. In the present instance, such means comprises a leaf spring 90 fixed to the lever 71 and having its free upper end engageable with an abutment 91 within the nose cap 24.

In order to effect adjustment in the attitude or posture of the earthworking unit 18, including the scraper blade 19 and scarifier 20, in a substantially vertical fore-and-aft plane, a safely located attitude control means readily accessible to the tractor operator is provided. This is accomplished by taking advantage of the hitch linkage between the implement 14 and the tractor T. In furtherance of such objective, there is interposed between a point on the main frame 15 and the upper end of the A-frame 16 a forwardly and upwardly inclined strut 92 of variable length. In the present instance, the strut 92 comprises a tubular element 94 having a tapped longitudinal bore for receiving a threaded bar 95 which terminates at its upper end in a hand crank 96. The trailing end of the strut 92 is pivotally attached to the implement frame 15 by means of a flattened end portion 98 pinned as at 99 to an upstanding slotted extension 100 of the pivot stem 52 (Figs. 1, 2 and 7). Adjacent its leading end, the strut 92 is connected to the upper end of the A-frame 16 by means of a spacer member 101 having an opening 102 therethrough for receiving the bar 95 (Fig. 4). The latter is constrained against longitudinal movement relative to the opening 102 by means of a pair of axially spaced collars 104 fixed to the bar 95. The collars 104, however, do not restrain the bar 95 against rotational movement in the bore 102. The spacer block 101 is pivotally attached to the A-frame 16 as by means of trunnions 105 journaled in the members 32 and retained as by means of nuts and thrust washers 106, 108 (see Fig. 4). By reason of the structure just described, it will be appreciated that rotation of the hand crank 96 in one direction will tend to shorten the strut 92 and while rotation of the crank in the opposite direction will tend to lengthen such strut. This, in turn, causes the entire implement, including the earthworking unit 18, to pivot in a fore-and-aft plane about the hitch pins 31 and thus effects the desired attitude of adjustment.

In addition to the scarifier device 20, the scraper implement 14 may be equipped with various other attachments. Referring to Figs. 1 and 2, it will be observed that the earthworking unit 18 is fitted with side wings 110, only one of which is shown. Each of the wings 110 is secured in upright position to the extremities of the mold board 41 and scraper blade 19 and may be reinforced as by means of a suitable anchor brace 111 attached to the transverse beam 36. By confining a greater volume of earth to the face of the scraper and the mold board, the wings 110 increase the yardage capacity of the implement.

In addition to the wings 110, the mold board 41 and scraper blade 19 may support end extensions (not shown) to increase the width of cut of the scraper. Such extensions may readily be bolted to the mold board and scraper blade by means of appropriate stiffeners, the mold board 41 being provided with additional holes 112 for this purpose.

To better adapt the implement 14 for use in land leveling operations, the implement is equipped with the land wheel 21. In the present instance, the latter is journaled at the depending end of a fork 114. The fork 114, in turn, has an upstanding pin 115 journaled in a tubular extension 116 of the main frame body 22, being retained in the extension 115 as by means of a nut 118. When the land wheel 21 is to be attached to the implement, the tail cap 25 is removed and the tubular extension 116, which has a portion of reduced diameter, is telescopically attached to the trailing end of the tubular body 22 and retained in place by means of the bolt 26. Should the operator for any reason desire to maintain the land wheel 21 in an inoperative position, he has merely to remove the bolt 26 and rotate the extension 116 through 180° so that the wheel occupies the upstanding transport position indicated in dot-dash lines in Fig. 7. The wheel 21 and its supporting elements may be maintained in this position by reinserting the bolt 26 through the member 22 and the tubular extension 116.

Turning once more to Fig. 7, it will be noted that the depending end portions of the A-frame 16 are each provided with an additional aperture 119 which mounts an additional hitch pin 120 each in vertically spaced relation with its associated one of the hitch pins 31. This arrangement makes it possible to produce a pre-tilt adjustment of the implement blade 19 by connecting either one of the tractor hitch links 10 to one of the pins 120 rather than the regular hitch pin 31. For example, if the right-hand tractor hitch link 10 (as viewed from the rear) should be connected to the right-hand one of the pins 120, the right-hand end of the blade 19 will be tilted downward. On the other hand, if the hitch link 10 on the left side of the tractor should be connected to the leftmost one of the link pins 120, the left-hand end of the blade 19 will receive a downward tilt. After the blade 19 has been pre-tilted in the foregoing manner, additional lateral tilt may be provided by the use of the gear box 121 in the lift link 122 which connects with the right-hand one of the hitch links 10 on the tractor. The gear box 121 may readily be operated by the handle 123 and effects tilting action by varying the length of the right-hand lift link 122.

The advantage of the foregoing arrangement lies in the elimination of the need for an additional gear box in the left-hand one of the lift links 122 on the tractor. Such a gear box would otherwise be required to obtain the desired degree of lateral tilt of the blade 19 in the absence of the pre-tilting means described above. In other words, by merely providing the additional apertures 119 and pins 120 in the A-frame 16, the necessity for providing a considerably more expensive additional gear box is eliminated.

I claim as my invention:

1. A scraper implement for use with a tractor and comprising the combination of a hollow main frame, means for detachably securing said main frame to the tractor, an earthworking unit mounted in depending relation on said main frame for selective adjustment in any one of a number of precise angular positions about a generally upright axis, means including a detent for maintaining said unit in any one of said angular positions, a manual control including a hand lever pivoted within the leading end of said hollow main frame and extending through a slot in the frame, and force transmitting means protectively housed within said main frame and connecting said hand lever and said detent.

2. A scraper implement detachably connectible to a tractor and comprising, in combination, a tubular main frame, means for detachably securing said main frame to the tractor, an earthworking unit mounted in depending relation on said main frame for pivoted movement about a generally upright axis, a toothed adjusting member fixed to said earthworking unit, a plunger slidably mounted on said main frame rearwardly of said toothed member and said earthworking unit for retaining the latter in a selected angular position about said generally upright axis, a manual actuating lever having one end pivotally secured within said main frame, a force transmitting means also housed within said frame and linking said plunger with said actuating lever, and a resilient loading element connected with said force transmitting means for biasing said plunger into engagement with said toothed adjusting member.

3. A scraper implement for use with a tractor and comprising, in combination, a tubular main frame, means for detachably connecting said main frame to the tractor, a depending pivot stem having its upper end portion extending diametrically into said main frame and rigidly fixed to the same, said upper end of said stem having a transverse bore therethrough, an earthworking unit journaled on said depending pivot stem, a toothed adjusting plate fixed to said earthworking unit, a guide block fixed to the underside of said main frame rearwardly of said pivot stem, a plunger slidably housed within said guide block for coaction with said toothed adjusting plate, a rocker arm housed within said main frame and adapted when rocked to reciprocate said plunger, a nose cap on said main frame having an arcuate slot, a manual actuating lever having one end pivoted within said nose cap, said lever extending through the slot therein, an actuating rod pivotally connected between said lever and said rocker arm, said rod extending through the transverse bore in said pivot stem, and a compression spring interposed between said pivot stem and an abutment on said actuating rod, said spring being adapted to effect a bias of said plunger against said toothed adjusting plate.

4. In a scraper implement having a hollow tubular main frame together with an earthworking unit mounted for adjustment about a generally upright axis, the combination comprising detent means for maintaining said unit in a selected adjusted position about said axis, a nose cap on said frame, said nose cap having an arcuate slot therein terminating in a laterally enlarged notch, a manual actuating lever connected with said detent by means housed within the main frame, said lever being pivotally secured within said nose cap but disposed so as to project through the arcuate slot therein, and a biasing element for retaining said actuating lever in engagement with said notch, the latter defining the disengaged position of said detent means and said lever.

5. In an adjustable scraper implement for attachment to a tractor, an earthworking unit comprising the combination of a transverse beam, an upright bearing sleeve mounted centrally on said transverse beam, a plurality of gusset members fixed in spaced apart and depending relation along said beam, a channel-shaped stiffener fixed to said structural members, a pair of said gusset members straddling said bearing sleeve and being rigidly fixed thereto, a mold board fixed to said beam and to said stiffener, said mold board having a concave earth engaging face with a longitudinal offset along the lower edge portion thereof, a scraper blade fixed to said mold board and to said channel, said blade being mounted against said offset and with its earth engaging face substantially coplanar with that of said mold board, and a pair of side wings disposed at opposite ends of said scraper blade and said mold board, said wings being attached to said beam, said mold board and said scraper blade.

6. A scraper implement for use with a tractor and comprising the combination of a tubular main frame, an earthworking unit mounted in depending relation on said main frame, means pivotally attaching said main frame to the tractor at vertically spaced points, a tubular extension having a portion of reduced diameter telescopingly fitted into said main frame to connect the extension in coaxial relation to the main frame for rotation about the longitudinal axis of the latter, a fork projecting from said extension, a land wheel journaled on the projecting ends of said fork, and a bolt insertable through the reduced portion of said tubular extension and said main frame to rigidly secure the extension with said land wheel in ground engaging position and alternatively in transport position.

7. A scraper implement for attachment in trailed relation to a tractor and comprising, in combination, a hollow main frame, means including an upstanding member pivotally attached to said main frame and detachably connectible to said tractor at vertically spaced points, a variable length tubular strut interposed between said upstanding member and said main frame for adjusting the attitude of said implement in a general fore-and-aft plane, an earthworking unit pivoted on said main frame for movement about a generally upright axis, a first detent element on said main frame, a second detent element on said earthworking unit, coacting wedge faces on said detent elements rendering the latter self-compensating for wear, said detent elements being engageable to locate said earthworking unit in any one of a number of selected angular positions about said upright axis, spring means yieldably urging said detent elements into engaged relation, a manual control including a hand lever pivoted adjacent the leading end of said main frame, and a tension link protectively housed within said main frame connected between said hand lever and one of said detent elements operative upon rocking of the hand lever upon its pivot to disengage said one detent element from the other detent element and release the earthworking unit for angular adjustment.

8. In a universally adjustable scraper implement for attachment to a tractor, the combination comprising an elongate tubular body, a pair of alined transverse draft beams fixed to the forward end portion of said tubular body for attachment to the tractor, a pivot stem fixed to said tubular body and projecting radially in depending relation therefrom, an earthworking unit mounted on said pivot stem for rotation thereon, a tail cap on said body, a nose cap on said body, and a manual control fixed to said nose cap and operatively connected to said earthworking unit, said control being adapted to release the earthworking unit for movement about the pivot stem.

References Cited in the file of this patent

UNITED STATES PATENTS

| | | |
|---|---|---|
| 632,906 | Swasey | Sept. 12, 1899 |
| 1,282,025 | Bauchet | Oct. 22, 1918 |
| 1,484,622 | Claus | Feb. 26, 1924 |
| 1,501,651 | Ferguson | July 15, 1924 |
| 1,956,385 | Gipford | Apr. 24, 1934 |
| 2,067,781 | Mueller | Jan. 12, 1937 |
| 2,089,730 | Brown et al. | Aug. 10, 1937 |
| 2,137,829 | Austin | Nov. 22, 1938 |
| 2,141,805 | White | Dec. 27, 1938 |
| 2,251,452 | Hirst | Aug. 5, 1941 |
| 2,351,830 | Mitchell et al. | June 20, 1944 |
| 2,395,893 | Marlow | Mar. 5, 1946 |
| 2,417,595 | Heath | Mar. 18, 1947 |

(Other references on following page)

UNITED STATES PATENTS

| | | |
|---|---|---|
| 2,440,550 | Martin | Apr. 27, 1948 |
| 2,456,693 | Fraga | Dec. 21, 1948 |
| 2,468,380 | Smith | Apr. 26, 1949 |
| 2,476,195 | Horman | July 12, 1949 |
| 2,493,565 | Arps | Jan. 3, 1950 |
| 2,496,760 | Watson | Feb. 7, 1950 |
| 2,510,445 | Way | June 6, 1950 |
| 2,526,186 | Allen et al. | Oct. 17, 1950 |
| 2,560,711 | Arps | July 17, 1951 |
| 2,562,486 | Denning | July 31, 1951 |
| 2,564,355 | Danuser | Aug. 14, 1951 |
| 2,566,547 | Bartlett | Sept. 4, 1951 |
| 2,589,554 | Killian | Mar. 18, 1952 |
| 2,624,132 | Henry | Jan. 6, 1953 |
| 2,633,787 | Nelson | Apr. 7, 1953 |
| 2,654,967 | Small | Oct. 13, 1953 |
| 2,663,239 | Rapp et al. | Dec. 22, 1953 |
| 2,711,036 | Crenshaw | June 21, 1955 |